(No Model.)
M. MANNEWITZ.
COTTON PLANTER.
No. 544,737. Patented Aug. 20, 1895.
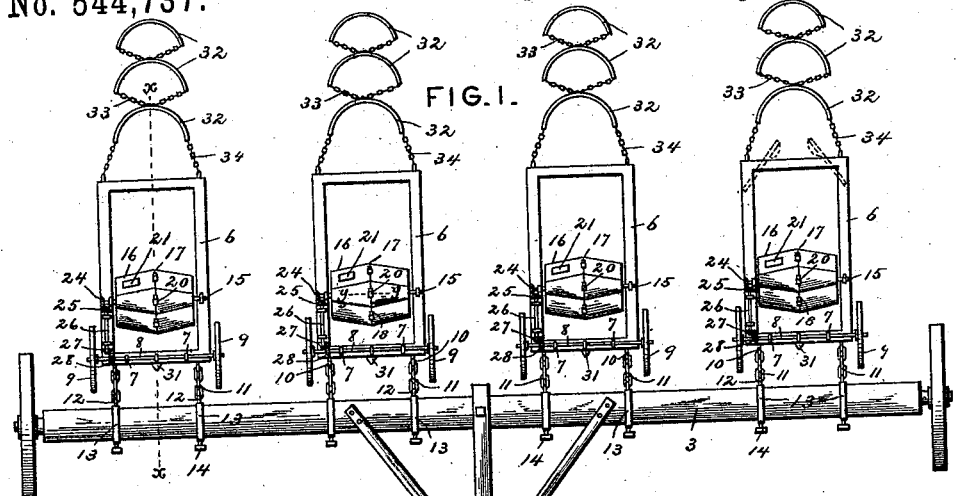
FIG. 1.
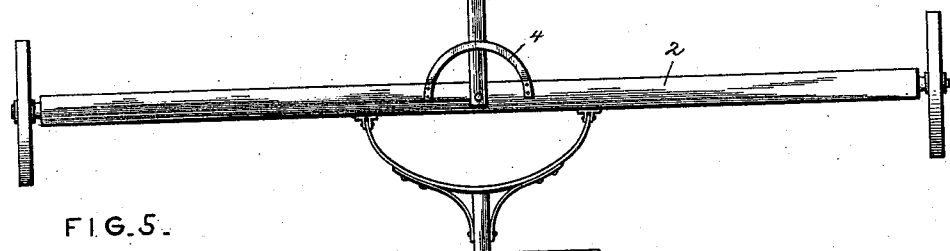
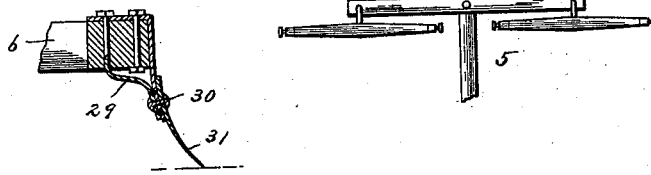
FIG. 5.
FIG. 3.
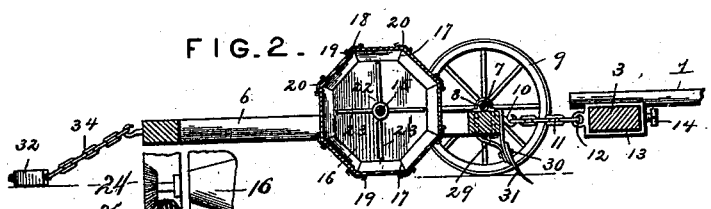
FIG. 2.
FIG. 4.
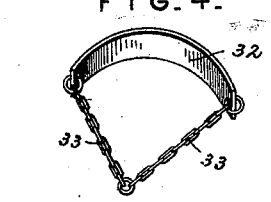
FIG. 6.
Witnesses
Harry L. Amer.
D. P. Alhaupt.
Inventor
Maximilian Mannewitz.
By his Attorneys.
C. A. Snow & Co.
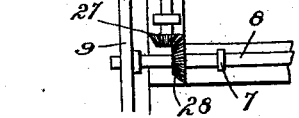

UNITED STATES PATENT OFFICE.

MAXIMILIAN MANNEWITZ, OF ABILENE, TEXAS.

COTTON-PLANTER.

SPECIFICATION forming part of Letters Patent No. 544,737, dated August 20, 1895.

Application filed November 5, 1894. Serial No. 527,898. (No model.)

*To all whom it may concern:*

Be it known that I, MAXIMILIAN MANNE-WITZ, a citizen of the United States, residing at Abilene, in the county of Taylor and State of Texas, have invented a new and useful Cotton-Planter, of which the following is a specification.

This invention relates to cotton-planters, and it has for its object to provide a new and useful machine of this character providing simple and efficient means for planting four or more rows at one time.

To this end the main and primary object of the present invention is to provide a cotton-planter that can be easily worked over rough, stony, and uneven ground, while at the same time having means for opening the furrow, dropping the seed, and covering up the furrow in one operation.

With these and other objects in view, which will readily appear as the nature of the invention is better understood, the same consists in the novel construction, combination, and arrangement of parts hereinafter more fully described, illustrated, and claimed.

In the drawings, Figure 1 is a plan view of a cotton-planter constructed in accordance with this invention. Fig. 2 is an enlarged sectional view on the line $x$ $x$ of Fig. 1. Fig. 3 is a detail sectional view on the line $y$ $y$ of Fig. 1. Fig. 4 is a detail in perspective of one of the segmental covering drag-shoes. Fig. 5 is an enlarged detail sectional view at the front end of one of the hopper-frames. Fig. 6 is an enlarged detail plan view showing more clearly the gear connections for transmitting motion to the stirrers within the hoppers.

Referring to the accompanying drawings, 1 designates a wheel-truck essentially comprising the connected front and rear axles 2 and 3, respectively, the front axle 2 being provided with the usual fifth-wheel connection 4 and having connected therewith an ordinary draft-tongue 5, to which the animals are connected for drawing the machine over the ground for planting the seed.

The width of the wheel-truck 1 is proportioned relatively to the number of rows to be planted at the same time, and to the rear axle 3 of said wheel-truck is adapted to be flexibly connected a series of rectangular hopper-frames 6. The rectangular hopper-frames 6 are arranged at the rear of the axle 3, between the wheels thereof and at regularly-spaced distances apart, there being one of said frames 6 for each row of cotton to be planted. The said rectangular hopper-frames 6 are provided at their front ends with the bearing-boxes 7, in which are journaled revolving front shafts 8, arranged transversely on the front ends of the frames 6 and carrying at their opposite ends the ground-wheels 9, that serve to support the front ends of said hopper-frames and also to communicate motion to the shafts 8 at the front ends thereof.

The front ends of the rectangular hopper-frames 6 have suitably attached thereto the offstanding attaching-hooks 10, with which are adapted to be adjustably engaged the links of the drag-chains 11, one end of which chains are connected to the eyes 12 at one end of the rectangular clamp-loops 13, that embrace the rear axle 3 and are held clamped in any adjusted position thereon by means of the clamp-screws 14, engaging in threaded openings in one end of said loops and binding against one side of the said rear axle 3. The connections described provide for adjustably connecting the rectangular hopper-frames 6 to the rear axle of the truck according to the distance between the rows being planted, and near their front ends the said hopper-frames have journaled thereon the transverse revolving hopper-axles 15, on which are mounted to freely revolve between the side bars of the frames 6 the rolling seed-hoppers 16.

The rolling seed-hoppers 16 are polygonal in cross-section and are contracted toward both ends to provide an enlarged central ridge portion 17, toward which the seed necessarily runs from both ends of the hopper and will therefore be entirely discharged therefrom. The said rolling hoppers 16 are provided on each of their sides and in the enlarged central ridge portions 17 thereof with the dropping-openings 18, at opposite side edges of which are formed the guide-flanges 19 to receive the side edges of the V-shaped adjusting-slides 20, which provide for regulating the size of the openings through which the seed is to fall, and by reason of the arrangement of the dropping-openings and the construction of the rolling seed-hoppers it will be obvious that the seed will drop from the hoppers until the same are entirely emptied. The said hoppers 16 may be refilled at any time through suitably-arranged doors 21, located in one side thereof.

The seed-hoppers 16 roll on the ground and the central ridge portions thereof travel in the furrows in which the seed is dropped, and the axles 15, on which the hoppers turn, are adapted to revolve in an opposite direction to said hoppers and carry thereon, centrally within the hoppers, seed-stirrers 22, consisting of a series of crossed arms 23, attached to the hopper-axles and providing means for stirring up the seed and preventing the same from clogging within the dropping-openings of the hoppers. The said revolving-hopper axles have attached to one end thereof outside of the hoppers the beveled gear-pinions 24, that mesh with similar pinions 25 on the rear ends of the short drive-shafts 26, the front ends of which carry beveled gear-pinions 27, meshing with adjacent pinions 28 on the revolving front shafts 8 of the frames 6, thereby completing a gearing connection with said front shafts to provide for transmitting motion to the stirrers within the rolling hoppers.

The front ends of the wheeled rectangular hopper-frames 6 are adapted to have centrally connected thereto the plow-standards 29, to the lower ends of which are adjustably bolted, by means of the bolts 30, the opening plow-shovels 21 that provide for opening up a furrow to receive the seed from the rolling hoppers traveling within the frames 6 in rear of said opening-shovels, and arranged in rear of the hopper-frames 6 are an aligned series of segmental covering drag-shoes 32. The segmental covering drag-shoes 32 are arranged at spaced distances apart and are loosely and flexibly connected together by means of short connecting-chains 33, and the front drag-shoe of each series is connected directly to the rear end of the frames 6 by means of the attaching-chains 34, that are also connected to the extremities of said front drag-shoes. The series of drag-shoes 32 are trailed loosely over the ground in rear of and in line with the centers of the frames 6, so as to provide for covering up the furrows that have received the seed from the rolling hoppers 16, and while these drag-shoes are described for accomplishing the covering of the furrows still it will be understood that ordinary covering-shovels might be substituted therefor and suitably attached directly to the rear ends of the frames 6, as indicated by dotted lines in Fig. 1.

Changes in the form, proportion, and the minor details of construction may be resorted to without departing from the principle or sacrificing any of the advantages of this invention, and at this point attention is directed to the fact that when the herein-described machine is not in operation the hopper-frames, including the working parts of the machine carried thereby, can be conveniently laid on the axles 2 and 3 of the wheeled truck, thereby providing a convenient means for carrying the working parts of the machine to and from the field when the machine is not in operation.

Having thus described the invention, what is claimed, and desired to be secured by Letters Patent, is—

1. In a cotton planter, a wheeled truck, a transverse series of wheeled hopper frames carrying openers and coverers said wheeled hopper frames being flexibly and adjustably connected with the rear axle of said truck, hopper axles journaled on said hopper frames and carrying stirrers, means for imparting a positive rotation to said hopper axles, and rolling seed hoppers loosely mounted on said revolving axles, substantially as set forth.

2. In a cotton planter, the combination of a wheeled truck, a transverse series of wheeled hopper frames carrying openers and coverers and arranged in rear of the rear axle of the truck, said hopper frames being provided at their front ends with attaching hooks, rectangular clamp loops adjustably clamped on the rear axle of the truck, drag chains connected at one end to said clamp loops and adjustably at their other ends to the hooks of said hopper frames, and rolling seed hoppers mounted within said hopper frames, substantially as set forth.

3. In a cotton planter, the combination of a wheeled truck, a transverse series of wheeled hopper frames connected with the rear axle of the truck and carrying opening shovels at their front ends, rolling seed hoppers mounted within said hopper frames, an aligned series of segmental covering drag-shoes located at the rear end of the hopper frames and being arranged with one directly in advance of the other, and flexible connections between said shoes and also with said hopper frames, substantially as set forth.

4. In a cotton planter, the combination of a rectangular frame, a revolving shaft journaled on the front end of said frame and carrying ground wheels at its opposite ends, a revolving hopper axle journaled on the frame and geared with said front shaft, a rolling hopper box loosely mounted on said axle and contracted toward both ends to provide an enlarged central ridge portion, said rolling hopper being further provided with a central circular series of dropping openings, a stirrer mounted on the hopper axle within the hopper, an opening shovel attached to the front end of the frame, and coverers connected with the rear end of said frame, substantially as set forth.

In testimony that I claim the foregoing as my own I have hereto affixed my signature in the presence of two witnesses.

M. MANNEWITZ.

Witnesses:
J. T. CLARK,
A. BOULTER.